3,271,428
NOVEL ESTRATRIENE OXIMINO ETHERS AND METHODS FOR THEIR MANUFACTURE

Frank J. Villani, West Caldwell, N.J., assignor to Schering Corporation, Bloomfield, N.J., a corporation of New Jersey
No Drawing. Filed Sept. 28, 1964, Ser. No. 399,833
12 Claims. (Cl. 260—397.5)

This application is a continuation-in-part of copending application Serial No. 297,659, filed July 25, 1963, now abandoned.

This application relates to novel steroidal derivatives which are therapeutically active. More specifically, this application relates to tertiary aminoalkyloximino derivatives of steroids of the estrane series which are therapeutically useful, to pharmaceutical compositions thereof, and to methods for their manufacture, including novel intermediates produced thereby.

My invention provides for compounds of the following Formula I:

$$B=N-O-Z-A \qquad (I)$$

wherein B is a 3-hydroxy-1,3,5(10)-estratriene and derivatives thereof attached to the nitrogen through an exocyclic double bond such as at the 11- and 17-carbon atoms; Z is a lower alkylene having from 2 to 5 carbon atoms; and A is a tertiary amine, preferably a dialkylamino group, and its salts and quaternary lower alkyl ammonium salts, but also including other tertiary amine derivatives such as a lower alkylene imino group (e.g., piperidino), a lower oxa-alkylene imino group (e.g., morpholino), a lower aza-alkylene imino group (e.g., N-methylpiperazino), and other heterocyclic functions including salts and quaternary ammonium compounds thereof, especially lower alkyl ammonium salts.

Included among the preferred di-lower alkylamino functions, A (wherein the lower alkyl moieties have preferably up to 4 carbon atoms), are such as dimethylamino, diethylamino, dipropylamino, methyl-ethylamino, methyl-propylamino, di-butylamino, and the like. Also included within the definition of di-lower alkylamino are substituted alkyl-alkylamino groups, particularly, benzyl-alkylamino groups such as benzyl-methylamino, benzyl-ethylamino, benzyl-propylamino and the like.

The benzyl-lower alkylamino oximino estratriene derivatives are particularly valuable as intermediates since, upon reaction with palladium on charcoal in ethanol utilizing known techniques, the benzyl group is reductively cleaved and there is formed the corresponding mono-lower alkylaminoalkylene oximino estratriene.

Among the alkylene bridge groups, Z, contemplated in the oximino ether function, such as at C–17, are straight-chained and branched hydrocarbon radicals having preferably from 2 to 5 carbon atoms, including ethylene, propylene, methylethylene, butylene, methylpropylene, dimethylethylene, pentylene, and the like.

Illustrative of the acid salts and anions of the quaternary salts contemplated are those of inorganic or organic acids such as hydrohalic acids (e.g., hydrochloric, hydrobromic, and hydroiodic acid), sulfuric acid, nitric acid, phosphoric acids, perchloric acid, alkylsulfonic acids (e.g., methane or ethane sulfonic acid), benzenesulfonic acids (e.g., p-toluenesulfonic acid), naphthalenesulfonic acids, oxalic acid, tartaric acid, citric acid, lactic acid, maleic acid, benzoic acid, salicyclic acid, p-aminosalicyclic acid, acetyl salicyclic acid, amino acids, or alkyl sulfuric acids, such as methyl sulfuric acid.

Included among the preferred compounds of my invention are 17 - dialkylamino - alkoximino - estratrienes wherein the alkoximino moiety has from 2 to 5 carbon atoms, and which are defined by the following formula and the non-toxic, pharmaceutically acceptable acid addition and quaternary ammonium salts thereof:

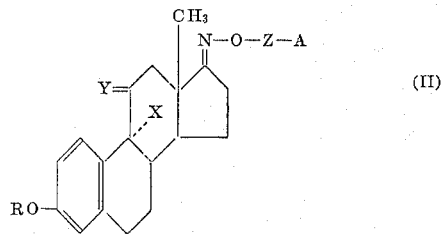

wherein Z is alkylene; A is a di-lower alkylamino; R is a member selected from the group consisting of hydrogen, lower alkyl, and an acid radical of a hydrocarbon carboxylic acid having up to 8 carbon atoms: X is hydrogen; Y is a member selected from the group consisting of hydrogen, keto,

and N—O—Z—A wherein Z and A are as defined above, and together X and Y are members selected from the group consisting of 9α,11β-dichloro- and an additional bond.

Illustrative of the carboxylic acid esters contemplated at C–3 are lower alkanoates such as acetate, propionate, butyrate, valerate, caproate, and t-butyl-acetate; aroyl esters such as benzoate and toluate; esters from dibasic organic esters such as succinate, phthalate and sulfobenzoate. Also included in the term "acid radical" are the alkali metal salts of the dibasic carboxylic acid esters.

The above definition of the preferred compounds should be considered to admit the presence of other substituents on the steroid nucleus, particularly at positions 1-, 6-, and 16-, such as the 1-methyl-, 6α-methyl-, 6α-fluoro-, 6α-chloro-, and 16α-methyl-, and 16β-methyl-analogs thereof. This modification depends solely on the choice of starting material employed, which in this instance would involve the employment of a 17-keto-1,3,5(10)-estratriene possessing the desired substituent in the positions indicated, which substituents are introduced by methods known in the art.

The preferred compounds of my invention are those described above, i.e., estranes of Formula II wherein the tertiary amine function, A, is a dialkylamino, e.g., dimethylamino, diethylamino, dipropylamino, methyl-ethylamino, benzyl-methylamino, and the like. Also included within my invention and considered as equivalent to the above-described oximino ethers are those oximino derivatives of Formula I and II wherein the tertiary amine function, A, is a nitrogen containing heterocyclic radical such as piperidino, pyrrolidino, N-methylpiperazino. The heterocyclic radicals may be substituted or unsubstituted in any desired manner.

My estrane oximino ethers such as defined by Formula II are surprisingly valuable as anti-androgens and, thus are useful in countering the effects of androgen-induced conditions or states. The novel estrane oximino ethers, particularly those of Formula II wherein X and Y are hydrogen such as 17-(β-dimethylaminoethoximino)-1,3,5(10)-estratriene-3-ol, 17 - (β-diethylaminoethoximino)-1,3,5(10)-estratriene-3-ol, their acid salts and quaternary lower-alkyl ammonium salts, are also hypocholesterimic agents being valuable as cholesterol lowering agents, and are valuable as antifertility agents.

The 9(11)-dehydro derivatives of Formula II are valuable mainly as intermediates in one of the methods of preparing the therapeutically valuable 9α,11β-dichloro derivatives. For example, 17-(β-dimethylaminoethoximino)-1,3,5(10),9(11)-estratetraene-3-ol-3-acetate upon reaction with anhydrous chlorine in carbon tetrachloride to which pyridine has been added according to methods described in U.S. Patent No. 3,076,829 will yield the therapeutically valuable 9α,11β-dichloro-17-(β-dimethylaminoethoximino)-1,3,5(10)-estratriene-3-ol.

Among the 17-tertiary-aminoalkoximino estranes of my invention are derivatives such as 17-(β-dimethylaminoethoximino)-1,3,5(10)-estratriene-3-ol, 17 - (β - diethylaminoethoximino)-1,3,5(10)-estratriene-3-ol and the hydrochloride salts and methiodide quaternary salts thereof, as well as the 3-acetate and 3-benzoate esters and the 3-methyl ether derivatives thereof. Other oximino ethers include 17-(β-N-methyl-N-benzylaminoethoximino)-1,3,5(10)-estratriene-3-ol and 17-(β-diethylaminopentoximino)-1,3,5(10)-estratriene - 3 - ol and 9α,11β - chloro derivatives such as 3-acetoxy-9α,11β-dichloro-17-(β-dimethylaminoethoximino)-1,3,5(10)-estratriene, 1-methyl-3-methoxy-9α,11β-dichloro - 17 - (γ - diethylaminopropoximino)-1,3,5(10)-estratriene; 11-oxygenated derivatives such as 3-acetoxy-11β-hydroxy - 17 - (β - dimethylaminoethoximino)-1,3,5(10)-estratriene, 9(11)-dehydro derivatives such as 3-methoxy-17-(β-dimethylaminoethoximino)-1,3,5(10),9(11)-estratetraene.

The novel estrane oximino ethers of my invention are conveniently derived from the corresponding ketone derivative of an estrane, preferably a 17-keto-1,3,5(10)-estratriene devoid of ketone functions elsewhere in the steroid molecule, e.g., estrone (1,3,5(10)-estratriene-3-ol-17-one) by reaction with a member of the group consisting of an O-alkylhydroxylamine substituted in the alkyl group by a tertiary-amine (preferably a dialkylamine), i.e., a tertiary-aminoalkoxamine, an acid salt of said O-tertiary-amine substituted alkylhydroxylamine, or an O-alkylhydroxylamine substituted in the alkyl group by a radical convertible to a tertiary-amine.

Exemplary of a radical convertible to a tertiary-amine is a halide, a free hydroxyl group, or a reactively esterified hydroxyl group, particularly a sulfonyloxy group. Conversion of these radicals into an amino group is effected utilizing procedures similar to those known in the art, e.g., a radical containing a hydroxy group is halogenated with thionyl chloride or esterified with p-toluenesulfonic acid, for example, and the resultant halide or reactive ester, e.g., the p-toluenesulfonyloxy derivative, is reacted with ammonia or an amine, e.g., a secondary amine such as diethylamine.

In a preferred mode of preparing a novel compound of my invention, e.g., 17-(β-dimethylaminoethoximino)-1,3,5(10)-estratriene-3-ol, an ethanolic solution of estrone is heated under reflux for about four hours with 1.1 molar equivalents of O-dimethylaminoethylhydroxylamine dihydrochloride in the presence of pyridine. After removal of the solvents in vacuo, isolation of the oximino ether free base from the resultant mixture of acid salts is effected by treatment with a mild base, e.g., sodium bicarbonate, whereby is obtained 17-(β-dimethylaminoethoximino)-1,3,5(10)-estratriene-3-ol.

Alternatively, by substituting the free base of the hydroxylamine reagent, e.g., O-dimethylaminoethylhydroxylamine, for the hydrochloride salt thereof as in the above-described procedure, there is obtained directly the oximino ether free base, e.g., 17-(β-dimethylaminoethoximino)-1,3,5(10)-estratriene-3-ol.

By utilizing other O-dialkylaminoalkylhydroxylamines in this process there is obtained the corresponding oximino ether. For example, reaction of estrone with O-diethylaminopentylhydroxylamine and O-dibutylaminopropylhydroxylamine, respectively, will yield 17-(ω-diethylaminopentoximino)-1,3,5(10)-estratriene-3-ol and 17 - (ω - dibutylaminopropoximino)-1,3,5(10)-estratriene - 3 - ol, respectively.

My process whereby a 17-keto estrane is reacted with a tertiary-aminoalkoxamine (i.e., an O-tertiary-amine substituted alkylhydroxylamine) or acid salt thereof, is the process of choice when it is desired to prepare an estrane-17-oximino ether having no other oximino ether function present in the molecule; for example, those compounds of Formula II wherein Y is other than

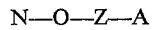

When preparing an estrane oximino ether such as 17-(β-dimethylaminoethoximino)-1,3,5(10)-estratriene - 3 - ol-11-one wherein the starting 17-keto estrane also has a keto function at C-11, e.g., 3-acetoxy-1,3,5(10)-estratriene-11,17-dione, it is preferable to use only approximately a molar equivalent of the tertiary-aminoalkoxamine reagent, e.g., O-dimethylaminoethylhydroxylamine (dimethylaminoethoxamine) to minimize the possibility of obtaining a mixture of products. In those cases wherein the starting steroid possesses a ketone function only at C-17 such as in estrone, an excess of O-substituted alkylhydroxylamine may be used, although I have found it preferable to use but a slight molar excess (e.g., 1.1 moles of O-dialkylaminoalkylhydroxylamine to one mole of estrone).

The 17-keto-estratriene starting compounds of the preferred process of preparing the novel oximino ethers of this invention are known compounds and may be prepared according to procedures such as outlined in U.S. Patent Nos. 2,874,173 and 3,076,829, for example. Typical starting compounds are such as estrone (1,3,5(10)-estratriene-3-ol-17-one), estrone methyl ether, estrone acetate, estrone benzoate, 9α,11β-dichloroestrone acetate, 11β-hydroxyestrone-3-acetate, and the like.

The O-dialkylaminoalkylhydroxylamines (e.g., dialkylaminoalkoximines) are known and prepared according to procedures well known in the art. For example, O-dimethylaminoethylhydroxylamine (dimethylaminoethoxamine) is conveniently prepared by reaction of (β-chloroethyl)-dimethylamine hydrochloride with the sodium salt of acetone oxime followed by treatment of the O-(β-dimethylaminoethyl)-acetone oxime thereby formed with aqueous hydrochloric acid.

The acid addition salts of the tertiary-aminoalkoximinoestrane derivatives of my invention are preferably prepared from the corresponding free base utilizing known techniques, e.g., by adding an anhydrous alkanol solution of the desired acid, such as those mentioned hereinabove, e.g., hydrocholric, maleic, or tartaric acid, to a solution of the free base in an inert solvent preferably one in which the acid salt is insoluble, e.g., ethereal solutions of 17-(β-dimethylaminoethoximino)-1,3,5(10)-estratriene-3-ol and 17-(β-diethylaminoethoximino)-1,3,5(10)-estratriene-3-ol whereby is obtained the corresponding hydrochloride, the maleate, and the tartrate salt, respectively.

The quaternary ammonium salts of this invention are prepared in known manner by treating the tertiary-aminoalkoximinoestrane free base with a quaternating agent, especially a reactive ester of a lower alkanol, such as an alkyl halide, e.g., methyl iodide, a sulfuric acid alkyl ester of a benzenesulfonic acid alkyl ester, such as p-toluenesulfonic acid alkyl ester. Thus, for example, treatment of 17-(β-diethylaminoethoximino)-1,3,5,(10)-estratriene-3-ol with methyl iodide, dimethyl sulfate and methyl p-toluenesulfonate, respectively, will yield 17-(β-N-methyl-N-diethylammoniumethoximino)-1,3,5(10)-estratriene-3-ol-iodide (which may also be named as 17-(β-N-diethylaminoethoximino)-1,3,5(10)-estratriene - 3 - ol methyliodide), 17-(β-N-methyl-N-diethylammoniumethoximino)-1,3,5(10)-estratriene-3-ol methyl sulfate, and 17-(β-N-methyl-N-diethylammoniumethoximino) - 1,3,5 (10)-estratriene-3-ol p-toluenesulfonate, respectively.

An alternate method of obtaining my estrane oximino ethers such as defined by Formula II consists in first converting a keto function such as at C-17 in estrone methyl ether to the corresponding oxime, e.g., 3-methoxy-17-oximino-1,3,5(10)-estratriene, by known methods such as with hydroxylamine hydrochloride in the presence of a base such as pyridine or sodium hydroxide. The tertiary-aminoalkyl radical is then introduced into the oximinoestrane derivative, i.e. 3-methoxy-17-oximino-1,3,5(10)-estratriene, by reaction preferably with a chloride of an alkyl-tertiary-amine (or a radical convertible into such a group) and, if desired, in the form of their salts, e.g. β-dimethylaminoethyl chloride, in the presence of a strong base, such as sodium ethylate, sodium amide, potassium carbonate, and the like, yielding 3-methoxy-17-(β-dimethylaminoethoximino) - 1,3,5(10)-estratriene of Formula I. In those resulting estrane oximino derivatives containing a radical convertible into an amino group, said radical is so converted.

This alternative procedure, whereby a 17-keto estrane derivative after conversion to the corresponding 17-oximino estrane is reacted with a tertiary-aminoalkyl halide to obtain a 17-oximino ether of Formula II is the preferred process when preparing an estrane containing more than one oximino function. Thus, 11-keto-estrone acetate (i.e., 1,3,5(10)-estratriene-3-ol-11,17-dione 3-acetate) upon reaction with hydroxylamine hydrochloride yields 11,17-bis-oximino-1,3,5(10)-estratriene-3-ol 3-acetate which, upon reaction with about 2 moles of β-(N,N-dimethylamino)-ethyl chloride will yield 11,17-bis-(β-dimethylaminoethoximino)-1,3,5(10) - estratriene-3-ol 3-acetate, a compound of Formula I wherein Y is N—O—Z—A.

In general, when preparing my novel 17-tertiary-aminoalkoximino estratrienes it is preferable to have all the desired substituents present in the steroid molecule prior to reaction with the O-tertiary-aminoalkylhydroxylamine reagent or hydroxylamine depending upon which process is contemplated. Thus, when preparing a 3-lower alkanoate, e.g., 3-acetate or 3-propionate, or a 3-lower alkyl ether (e.g., 3-methoxy) derivative of 17-(β-dimethylaminoethoximino)-1,3,5(10)-estratriene - 3 - ol, the preferred starting compounds are estrone acetate, estrone propionate, and estrone 3-methyl ether, respectively. Alternatively, the ester derivatives at C–3, e.g., the 3-acetate and 3-propionate, are prepared from the corresponding 3-hydroxy derivatives, e.g., 17 - (β-dimethylaminoethoximino)-1,3,5(10)-estratriene-3-ol, by reaction with a lower alkanoic acid anhydride, e.g., acetic anhydride and propionic anhydride, in pyridine. Similarly, the 3-methyl ether is prepared from the corresponding 3-hydroxy derivative by reaction with methyl sulfate according to known techniques.

My novel 17-(tertiary-aminoalkoximino)-estrane derivatives such as those of Formula II, their salts or quaternary ammonium compounds or mixtures thereof are advantageously administered via the oral route in the form of oral pharmaceutical preparations. In formulating these pharmaceutical compositions, a novel compound of this invention, e.g., 17-(β-dimethylaminoethoximino)-1,3,5(10) - estratriene - 3 - ol, is usually compounded with an excipient which is edible and chemically inert to the aforenamed oximino ether. Excipients such as lactose, sucrose, starch, pregelatinized starch, gum arabic, gum tragacanth, or mixtures thereof may be used usually in admixture with an additive such as magnesium stearate, talc, cornstarch, or the like.

Oral pharmaceutical composition forms other than tablets may be used. Thus, in general, fine powders or granules of 17-dialkylaminoalkoximino-1,3,5(10) - estratriene-3-ol and derivatives thereof such as defined by Formula I may contain diluents and dispersing and surface active agents and may be presented in a syrup, or in capsules, or cachets in the dry state, or in nonaqueous suspension, when a suspending agent may be included in tablets, when binders and lubricants may be included; or in a suspension in water, or in a syrup or in oil, or in water/oil emulsion when flavoring, preserving, thickening, emulsifying agents may be included. The granules or tablets may be coated.

The following are examples illustrating my invention. It is to be understood that the invention is not to be limited to the exact details of operation or to the exact showings and descriptions, as obvious modifications and equivalents will be apparent to one skilled in the art.

The invention is, therefore, to be limited only by the scope of the appended claims.

PREPARATION A.—OXIME REAGENT

*Dimethylaminoethoxyamine dihydrochloride*

Admix 73 g. acetone-oxime, 1 mole of dimethylaminoethylchloride hydrochloride, 427 g. of anhydrous potassium carbonate and 1.5 l. of benzene. Stir and reflux overnight. Cool, filter, and wash precipitate with hot benzene. Combine filtrates, concentrate to a residue and distill in vacuo to obtain the dimethylaminoethyl ether of acetone-oxime (B.P. 85–88°/50 mm.).

Admix 100 g. of acetone-oxime of the above and 1 liter of 10% aqueous hydrochloric acid. Stir on a steam bath for 15 hours. Concentrate to a residue in vacuo. Recrystallize the residue from methanol ether solvent obtaining dimethylaminoethoxyamine dihydrochloride (O-β - dimethylaminoethylhydroxylamine dihydrochloride). M.P. 181–182.5° C.

By substituting other equivalent tertiary-aminoalkyl chloride hydrochlorides for dimethylaminoethylchloride hydrochloride in the above preparation, the corresponding t-aminoalkoxyamine hydrochlorides are obtainable. Accordingly, there may be prepared by this method oxime reagents exemplified by the following alkoxyamines (it is understood that these reagents are prepared as above and are obtained in the form of their dihydrochloride salts):

dimethylaminopropoxyamine,
dimethylaminobutoxyamine,
diethylaminobutoxyamine,
diethylaminoethoxyamine,
diethylaminopropoxyamine,
diethylaminoisopropoxyamine,
diethylaminopentoxyamine,
benzylmethylaminoethoxyamine,
pyrrolidinoethoxyamine,
pyrrolidinopropoxyamine,
piperidinoethoxyamine,
piperidinopropoxyamine,
morpholinoethoxyamine,
morpholinobutoxyamine,
piperazinoethoxyamine,
N-1-methyl-N-4-piperazinoethoxyamine and
N-1-(hydroxyethyl)-N-4-piperazinopropoxyamine.

EXAMPLE 1.—17-(β-DIALKYLAMINOETHOXIMINO)-1,3,5(10)-ESTRATRIENE-3-OL

Heat under reflux for 4 hours a mixture of 2.7 g. of estrone, 2.0 g. of O-dimethylaminoethylhydroxylamine dihydrochloride, 10 ml. of pyridine, and 20 ml. of absolute ethanol. Distill the solvents in vacuo on a steam bath and dissolve the resultant residue in water. Neutralize the aqueous mixture with a saturated solution of sodium bicarbonate. Filter, wash thoroughly with water, and air dry the resultant precipitate of substantially 17-(β-dimethylaminoethoximino) - 1,3,5(10) - estratriene-3-ol. Purify by crystallization from a mixture of methylene chloride-pentane. M.P. 160–162° C.

In the above procedure, by substituting O-diethylaminoethylhydroxylamine dihydrochloride for O-dimethylaminoethylhydroxylamine dihydrochloride there is obtained 17-(β-diethylaminoethoximino)-1,3,5(10)-estratriene-3-ol.

In a similar manner, allow each of estrone 3-acetate, estrone 3-methyl ether, and estrone 3-benzoate to react with O - dimethylaminoethylhydroxylamine dihydrochloride in the above described manner to obtain, respectively, 3-acetoxy-17-(β-dimethylaminoethoximino) - 1,3,5(10)-estratriene, 3-methoxy - 17 - (β-dimethylaminoethoximino) - 1,3,5(10)-estratriene, and 3-benzoyloxy-17-(β-dimethylaminoethoximino)-1,3,5(10)-estratriene.

EXAMPLE 2.—17-(β-DIALKYLAMINOETHOXIMINO)-1,3,5(10)-ESTRATRIENE-3-OL HYDROCHLORIDE

To a solution of 2 g. of 17-(β-dimethylaminoethoximino)-1,3,5(10)-estratriene-3-ol in 300 ml. of anhydrous ether, add ethanol saturated with hydrogen chloride until the solution is acidic. Filter the resultant precipitate of 17-(β-dimethylaminoethoximino) - 1,3,5(10) - estratriene-3-ol hydrochloride. Purify by crystallization from ethanol-ether. M.P. 243–245° C.

In a similar manner, treat 17-(β-diethylaminoethoximino)-1,3,5(10)-estratriene-3-ol with ethanolic hydrogen chloride and isolate and purify the resultant product in the described manner to obtain 17-(β-diethylaminoethoximino)-1,3,5(10)-estratriene-3-ol hydrochloride. M.P. 222–223° C.

In a manner similar to that described above, treat each of 3-acetoxy - 17 - (β - dimethylaminoethoximino)-1,3,5(10) - estratriene, 3-methoxy-17-(β-dimethylaminoethoximino)-1,3,5(10)-estratriene, and 3-benzoyloxy-17-(β-dimethylaminoethoximino) - 1,3,5(10) - estratriene with ethanolic hydrogen chloride to obtain their respective hydrochloride salts, i.e., 3-acetoxy-17-(β-dimethylaminoethoximino)-1,3,5(10)-estratriene hydrochloride, 3-methoxy-17-(β-dimethylaminoethoximino) - 1,3,5(10) -estratriene hydrochloride, and 3-benzoyloxy-17-(β-dimethylaminoethoximino)-1,3,5(10)-estratriene hydrochloride.

EXAMPLE 3.—17 - (β - TRIALKYLAMMONIUMETHOXIMINO)-1,3,5(10)-ESTRATRIENE-3-OL IODIDE

To a solution of 2 g. of 17-(β-dimethylaminoethoximino)-1,3,5(10)-estratriene-3-ol in anhydrous ether, add 2 g. of methyl iodide and allow the mixture to stand for several hours. Filter off the resultant product of 17-(β-trimethylammoniumethoximino)-1,3,5(10) - estratriene iodide. Purify by crystallization from ethanol-ether. M.P. 270–271° C.

In a similar manner treat each of 17-(β-diethylaminoethoximino) - 1,3,5(10) - estratriene-3-ol, 3-acetoxy-17-(β-dimethylaminoethoximino)-1,3,5(10)-estratriene, 3-methoxy-17-(β-dimethylaminoethoximino) - 1,3,5(10) - estratriene, and 3-benzoyloxy-17-(β - dimethylaminoethoximino)-1,3,5(10)-estratriene with methyl iodide and isolate and purify the resultant products in the above-described manner to obtain, respectively, 17-(β-diethyl-methylammoniumethoximino) - 1,3,5(10)-estratriene-3-ol iodide, 3-acetoxy - 17 - (β - trimethylammoniumethoximino)-1,3,5(10)-estratriene iodide, 3-methoxy-17-(β-trimethylammoniumethoximino)-1,3,5(10)-estratriene iodide, and 3-benzoyloxy - 17 - (β-trimethylammoniumethoximino)-1,3,5(10)-estratriene iodide.

EXAMPLE 4.—9,11-DISUBSTITUTED - 17 - (β - DIALKYLAMINOETHOXIMINO)-1,3,5(10) - ESTRATRIENE-3-OLS AND DERIVATIVES THEREOF

A. In a manner similar to that described in Example 1, treat with O-dimethylaminoethylhydroxylamine dihydrochloride in the presence of pyridine an ethanolic solution of each of the following:

9(11)-dehydroestrone,
3-acetoxy-1,3,5(10),9(11)-estratetraene-17-one,
3-benzoyloxy-1,3,5(10),9(11)-estratetraene-17-one,
3-acetoxy-9α-11β-dichloro-1,3,5(10)-estratriene-17-one,
3-acetoxy-1,3,5(10)-estratriene-11β-ol-17-one,
3,11β-diacetoxy-1,3,5(10)-estratriene-17-one,
3-benzoyloxy-9α,11β-dichloro-1,3,5(10)-estratriene-17-one,
3-methoxy-1,3,5(10),9(11)-estratetraene-17-one,
3-methoxy-9α,11β-dichloro-1,3,5(10)-estratriene-17-one,
3-methoxy-11β-acetoxy-1,3,5(10)-estratriene-17-one,
3-methoxy-1,3,5(10)-estratriene-11β-ol-17-one,
1-methyl-1,3,5(10),9(11)-estratetraene-3-ol-17-one,
1-methyl-3-methoxy-1,3,5(10),9(11)-estratetraene-17-one,
1-methyl-3-acetoxy-1,3,5(10),9(11)-estratetraene-17-one,
1-methyl-3-methoxy-9α,11β-dichloro-1,3,5(10)-estratriene-17-one, and
9α,11β-dichloroestrone.

Isolate and purify the resultant respective products in a manner similar to that described to obtain, respectively, 17-(β-dimethylaminoethoximino)-1,3,5(10),9(11)-estratetraene-3-ol,
3-acetoxy-17-(β-dimethylaminoethoximino)-1,3,5(10),9(11)-estratetraene,
3-benzoyloxy-17-(β-dimethylaminoethoximino)-1,3,5(10),9(11)-estratetraene,
3-acetoxy-9α,11β-dichloro-17-(β-dimethylaminoethoximino)-1,3,5(10)-estratriene,
3-acetoxy-17-(β-dimethylaminoethoximino)-1,3,5(10)-estratriene-11β-ol,
3,11β-diacetoxy-17-(β-dimethylaminoethoximino)-1,3,5(10)-estratriene,
3-benzoyloxy-9α,11β-dichloro-17-(β-dimethylaminoethoximino)-1,3,5(10)-estratriene,
3-methoxy-17-(β-dimethylaminoethoximino)-1,3,5(10),9(11)-estratetraene,
3-methoxy-9α,11β-dichloro-17-(β-dimethylaminoethoximino)-1,3,5(10)-estratriene,
3-methoxy-11β-acetoxy-17-(β-dimethylaminoethoximino)-1,3,5(10)-estratriene,
3-methoxy-17-(β-dimethylaminoethoximino)-1,3,5(10)-estratriene-11β-ol,
1-methyl-17-(β-dimethylaminoethoximino)-1,3,5(10)-estratriene-3-ol,
1-methyl-3-methoxy-17-(β-dimethylaminoethoximino)-1,3,5(10),9(11)-estratetraene,
1-methyl-3-acetoxy-17-(β-dimethylaminoethoximino)-1,3,5(10),9(11)-estratetraene,
1-methyl-3-methoxy-9α,11β-dichloro-17-(β-dimethylaminoethoximino)-1,3,5(10)-estratriene, and
9α,11β-dichloro-17-(β-dimethylaminoethoximino)-1,3,5(10)-estratriene-3-ol.

Similarly by substituting O-diethylaminoethylhydroxylamine dihydrochloride for O-dimethylaminoethylhydroxylamine dihydrochloride in the above procedure there is obtained the corresponding 17-(β-diethylaminoethoximino)-derivatives.

B. Treat each of the 17-(β-dimethylaminoethoximino)-estrane derivatives prepared in Example 4A with ethanolic hydrogen chloride in a manner similar to that described in Example 2 to obtain the respective hydrogen chloride acid salts thereof.

C. In a manner similar to that described in Example 3, treat each of the 17-(β-dimethylaminoethoximino)-estrane derivatives prepared in Example 4A with methyl iodide and isolate the resultant products in a manner similar to that described to obtain, respectively, 17-(β-trimethylammoniumethoximino)-1,3,5(10),9(11)-estratetraene-3-ol-iodide,
3-acetoxy-17-(β-trimethylammoniumethoximino)-1,3,5(10),9(11)-estratetraene iodide,
3-benzoyloxy-17-(β-trimethylammoniumethoximino)-1,3,5(10),9(11)-estratetraene iodide,
3-acetoxy-9α,11β-dichloro-17-(β-trimethylammoniumethoximino)-1,3,5(10)-estratriene iodide,
3-acetoxy-17-(β-trimethylammoniumethoximino)-1,3,5(10)-estratriene-11β-ol iodide,
3,11β-diacetoxy-17-(β-trimethylammoniumethoximino)-1,3,5(10)-estratriene iodide,
3-benzoyloxy-9α,11β-dichloro-17-(β-trimethylammoniumethoximino)-1,3,5(10)-estratriene iodide,
3-methoxy-17-(β-trimethylammoniumethoximino)-1,3,5(10),9(11)-estratetraene iodide,
3-methoxy-9α,11β-dichloro-17-(β-trimethylammoniumethoximino)-1,3,5(10)-estratriene iodide,
3-methoxy-11β-acetoxy-17-(β-trimethylammoniumethoximino)-1,3,5(10)-estratriene iodide,
3-methoxy-17-(β-trimethylammoniumethoximino)-1,3,5(10)-estratriene-11β-ol iodide,
1-methyl-17-(β-trimethylammoniumethoximino)1,3,5(10)-estratriene-3-ol iodide,
1-methyl-3-methoxy-17-(β-trimethylammoniumethoximino)-1,3,5(10),9(11)-estratetraene iodide, 1-methyl-3-acetoxy-17-(β-trimethylammoniumethoximino)-1,3,5(10),9(11)-estratetraene iodide,
1-methyl-3-methoxy-9α,11β-dichloro-17-(β-trimethylammoniumethoximino)-1,3,5(10)-estratriene iodide, and
9α,11β-dichloro-17-(β-trimethylammoniumethoximino)-1,3,5(10)-estratriene-3-ol iodide.

D. *1 - methyl-3-methoxy-9α,11β-dichloro-17-(γ-diethylaminopropoximino)-1,3,5(10)-estratriene.*—In a manner similar to that described in Example 1, treat 1-methyl-3-methoxy - 9α,11β - dichloro - 1,3,5(10) - estratriene - 17-one with diethylaminopropoxyamine dihydrochloride in pyridine and ethanol. Isolate and purify the resultant product in the described manner to give 1-methyl-3-methoxy - 9α,11β - dichloro - 17 - (γ - diethylaminopropoximino)-1,3,5(10)-estratriene.

E. *17 - (ω - diethylaminobutoximino) - 1,3,5(10)-estratriene-3,11β-diol 3-acetate.*—In a manner similar to that described in Example 1, treat 1,3,5(10)-estratriene-3,11β-diol-17-one 3-acetate with diethylaminobutoxyamine dihydrochloride in pyridine and ethanol. Isolate and purify the resultant product in the described manner to give 17-(ω - diethylaminobutoximino) - 1,3,5(10) - estratriene - 3,11β-diol 3-acetate.

EXAMPLE 5.—11,17-BIS-(β-DIMETHYLAMINOETHOXIMINO)-1,3,5(10)-ESTRATRIENE-3-OL-3-ACETATE

A. *11,17 - bis - oximino - 1,3,5(10) - estratriene - 3 - ol 3-acetate.*—Stir at reflux temperature for 4 hours a solution of 3 g. of 1,3,5(10)-estratriene-3-ol-11,17-dione 3-acetate and 1.5 g. of hydroxylamine hydrochloride in 3 ml. of pyridine and 10 ml. of ethanol. Distill the solvent in vacuo and add water to the resultant residue. Filter and air dry the precipitate of substantially 11,17-bis-oximino-1,3,5(10)-estratriene-3-ol 3-acetate. Purify by recrystallization from ethanol-water.

In a similar manner, allow 3-methoxy-1,3,5(10)-estratriene-11,17-dione, to react with hydroxylamine hydrochloride to obtain 3-methoxy-11,17-bis-oximino-1,3,5(10)-estratriene.

B. *11,17 - bis - (β - dimethylaminoethoximino) - 1,3,5(10)-estratriene-3-ol 3-acetate.*—Add 3 g. of 11,17-bis-oximino-1,3,5(10)-estratriene-3-ol 3-acetate to a solution of 0.25 g. of sodium in 50 ml. of anhydrous ethanol at room temperature. Stir for about 15 minutes at room temperature; then add a solution of 2 g. of β-dimethylaminoethyl chloride in 10 ml. of ethanol. Reflux with stirring for 4 hours; then distill the ethanol in vacuo on a steam bath. Add water to the resultant residue and extract with ether. In turn, extract the combined ether solution with dilute aqueous hydrochloric acid; then add ammonium hydroxide to the hydrochloric acid solution until alkaline. Extract the aqueous solution with methylene chloride. Evaporate the combined methylene chloride extracts in vacuo and recrystallize the resultant residue from methylene chloride hexane to give 11,17 - bis - (β - dimethylaminoethoximino) - 1,3,5(10)-estratriene-3-ol 3-acetate.

In a similar manner, trett 3 - methoxy-11,17 - bis-oximino-1,3,5(10)-estratriene with dimethylaminoethyl-chloride to obtain the corresponding 3-methoxy-11,17-bis-(β-dimethylaminoethoximino)-1,3,5(10)-estratriene.

In a manner similar to that described in Example 5B above, 17-oximino-1,3,5(10)-estratriene-3-ol is first reacted with sodium ethylate followed by treatment with β-dimethylaminoethyl chloride and the resultant product isolated and purified to give 17-(β-dimethylaminoethoximino)-1,3,5(10)-estratriene-3-ol.

Similarly, 3-methoxy-17-oximino-1,3,5(10)-estratriene is reacted with sodium ethylate followed by treatment with a solution of γ-piperidinopropylchloride-ethanol and the resultant product isolated and purified in the above described manner to give 3-methoxy-17-(γ-piperidinopropoximino)-1,3,5(10)-estratriene.

EXAMPLE 6.—3-ACETOXY-17-(β-DIMETHYLAMINOETHOXIMINO)-1,3,5(10)-ESTRATRIENE-11-ONE

In a manner similar to that described in Example 1, treat 3-acetoxy-1,3,5(10)-estratriene-11,17-dione with a molar equivalent of O-dimethylaminoethylhydroxylamine dihydrochloride in pyridine and ethanol. Isolate and purify the resultant product in a manner similar to that described to obtain 3-acetoxy-17-(β-N-dimethylaminoethoximino)-1,3,5(10)-estratriene-11-one.

EXAMPLE 7.—17-(β-BENZYL-METHYLAMINOETHOXIMINO)-1,3,5(10)-ESTRATRIENE-3-OL

In a manner similar to that described in Example 1, treat estrone with O-β-benzyl-methylaminoethylhydroxylamine dihydrochloride (benzyl-methylaminoethoxyamine) in pyridine and ethanol. Isolate and purify the resultant product in a manner similar to that described to give 17-(β - benzyl - methylaminoethoximino) - 1,3,5(10) - estratriene-3-ol.

EXAMPLE 8

17-(β-DIMETHYLAMINOETHOXIMINO)-1,3,5(10)-ESTRATRIENE-3-OL-MALEATE 17-(β-DIMETHYLAMINOETHOXIMINO)-1,3,5(10)-ESTRATRIENE-3-OL TARTRATE

To an ethereal solution of 17-(β-dimethylaminoethoximino)-1,3,5(10)-estratriene-3-ol add an ethereal solution of a molar equivalent of maleic acid. Filter the maleate salt which separates and purify by crystallization from iso-propyl acetate yielding 17-(β-dimethylaminoethoximino)-1,3,5(10)-estratriene-3-ol maleate.

In a similar manner, to an ethereal solution of 17-(β-dimethylaminoethoximino)-1,3,5(10)-estratriene add a molar equivalent of tartaric acid dissolved in ether. Filter the resultant tartrate salt which separates and purify by crystallization from iso-propyl acetate yielding 17-(β-dimethylaminoethoximino)-1,3,5(10)-estratriene-3-ol tartrate.

I claim:
1. A steroidal 17-oximino ether selected from the group consisting of 1,3,5(10)-estratrienes of the following structural formula, and the non-toxic, pharmaceutically acceptable acid-addition salts and quaternary lower alkyl ammonium salts thereof:

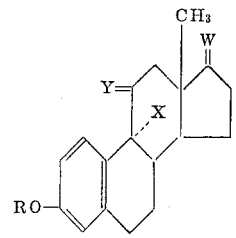

wherein W is a dilower alkylaminoalkoximino group defined by the formula (N—O—Z—A) wherein Z is alkylene having from two to five carbon atoms, and A is dilower alkylamino; R is a member selected from the group consisting of hydrogen, lower alkyl, and an acid radical of a hydrocarbon carboxylic acid having up to 8 carbon atoms; X is hydrogen; Y is a member selected from the group consisting of hydrogen, keto,

and W; and together X and Y are members selected from the group consisting of 9α,11β-dichloro and an additional bond.

2. 17 - (β-dimethylaminoethoximino)-1,3,5(10)-estratriene-3-ol.

3. 17 - (β-diethylaminoethoximino) - 1,3,5(10)-estratriene-3-ol.

4. 17 - (β-dimethylaminoethoximino)-1,3,5(10)-estratriene-3-ol methiodide.

5. 17 - (β-dimethylaminoethoximino)-1,3,5(10)-estratriene-3-ol hydrochloride.

6. 17 - (β-diethylaminoethoximino) - 1,3,5(10)-estratriene-3-ol hydrochloride.

7. 17 - (β-benzyl-methylaminoethoximino)-1,3,5(10)-estratriene-3-ol.

8. The process which comprises reacting a 17-keto-1,3,5(10)-estratriene-3-ol with an acid addition salt of an O-ω-dilower alklyamino alkylhydroxylamine wherein said alkylhydroxylamine moiety has from 2 to 5 carbon atoms, in the presence of base thereby forming the corresponding 17-(ω-dilower alkylamino alkoximino)-1,3,5(10)-estratriene-3-ol wherein said alkoximino moiety has from 2 to 5 carbon atoms.

9. The process which comprises reaction of estrone with an O-ω-dilower alkylamino alkylhydroxylamine dihydrochloride wherein said alkylhydroxylamine moiety has from 2 to 5 carbon atoms, in the presence of a base whereby is formed 17-(ω-dilower alkylaminoalkoximino)-1,3,5(10)-estratriene-3-ol wherein said alkoximino moiety has from 2 to 5 carbon atoms.

10. The process which comprises reacting estrone with approximately a molar equivalent of O-β-dimethylamino-ethyl-hydroxylamine dihydrochloride in the presence of pyridine whereby is formed 17-(β-dimethylaminoethoximino)-1,3,5(10)-estratriene-3-ol.

11. The process which comprises reacting a 17-keto-1,3,5(10)-estratriene-3-ol with hydroxylamine hydrochloride in the presence of a base, isolating the thereby formed 17-oximino-1,3,5(10)-estratriene-3-ol, and reacting said 17-oximino-1,3,5(10)-estratriene-3-ol in the presence of a base with a member of the group consisting of an ω-dilower alkylamino alkyl halide and acid salts thereof wherein said alkyl halide moiety has from 2 to 5 carbon atoms, whereby is formed a 17-(ω-dilower alkylamino alkoximino)-1,3,5(10)-estratriene-3-ol wherein said alkoximino moiety has from 2 to 5 carbon atoms.

12. The process which comprises reacting a 17-oximino-1,3,5(10)-estratriene-3-ol with an ω-dilower alkylamino alkyl halide, said alkyl halide moiety having from 2 to 5 carbon atoms, in the presence of a base whereby is formed a 17-(ω-dilower alkylamino alkoximino)-1,3,5 (10)-estratriene-3-ol, said alkoximino moiety having from 2 to 5 carbon atoms.

No references cited.

LEWIS GOTTS, *Primary Examiner.*

H. FRENCH, *Assistant Examiner.*